United States Patent Office 3,407,200
Patented Oct. 22, 1968

3,407,200
NOVEL ISOCYANURATE COMPOUNDS
Edwin D. Little and Charles R. Walter, Hopewell, Va., assignors to Allied Chemical Corporation, New York, N.Y., a corporation of New York
No Drawing. Filed Nov. 26, 1965, Ser. No. 510,081
5 Claims. (Cl. 260—248)

ABSTRACT OF THE DISCLOSURE

Di(2-cyanoethyl) isocyanurate is reacted with dimethyl sulfate at 20–100° C. to produce 1,3-di(2-cyanoethyl)-5-methyl isocyanurate. The 1,3-di(2-cyanoethyl)-5-methyl isocyanurate is then heated with a mineral acid to produce 1,3-di(2-carboxyethyl)-5-methyl isocyanurate.

---

This invention relates to novel isocyanurate compounds and more particularly to novel isocyanurate compounds derived from di(2-cyanoethyl) isocyanurate, and to methods for their preparation.

Isocyanurate compositions are useful as intermediates in the preparation of synthetic polymers from which fibers are prepared. The fibers prepared from isocyanurate compositions exhibit excellent properties such as strength and elasticity which is valuable in the manufacture of rope, hawsers, fishing lines, etc.

It is therefore an object of the present invention to provide the novel isocyanurate compound 1,3-di(2-cyanoethyl)-5-methyl isocyanurate and its hydrolysis product 1,3-di(2-carboxyethyl)-5-methyl isocyanurate.

It is a further object of this invention to provide a process whereby a novel compound, 1,3-di(2-cyanoethyl)-5-methyl isocyanurate and its novel hydrolysis product 1,3-di(2-carboxyethyl)-5-methyl isocyanurate will be produced.

These and other objects will become apparent from the following description of the invention.

In accordance with the present invention it has now been discovered that 1,3-di(2-cyanoethyl)-5-methyl isocyanurate is produced by a process which comprises reacting di(2-cyanoethyl) isocyanurate with dimethyl sulfate as illustrated by the following reaction:

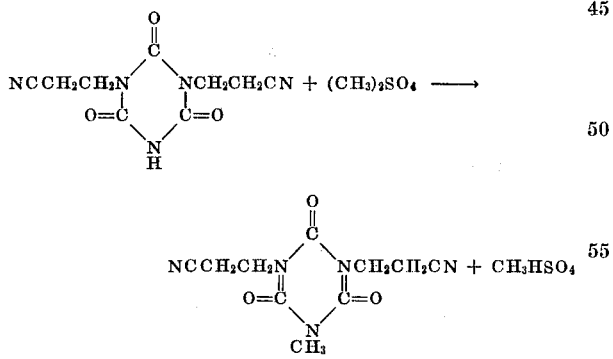

Thereafter the resultant subject compound is hydrolyzed, by heating the cyanoethyl compound with aqueous mineral acid, such as hydrochloric acid, or aqueous alkali to the corresponding 1,3-di(2-carboxyethyl)-5-methyl isocyanurate.

Polyesters made by condensing 1,3-di(2-carboxyethyl)-5-methyl isocyanurate with a polyol such as 1,6-hexanediol show good strength and high elasticity and are very useful in the preparation of fibers.

While the proportions of isocyanurate to dimethyl sulfate range from at least equimolar amounts up to an excess of dimethyl sulfate (of about 100% by weight based on the weight of isocyanurate) it has been found preferable to use equimolar amounts.

The alkylation reaction is desirably carried out at a temperature between about 20 and about 100° C., preferably the reaction is completed by refluxing at about 100° C. in aqueous solution, preferably containing at least one mol of caustic such as sodium or potassium hydroxide. The resultant product is precipitated and recovered by filtration.

The 1,3-di(2-cyanoethyl)-5-methyl isocyanurate may be hydrolyzed to the corresponding 1,3-di(2-carboxyethyl)-5-methyl isocyanurate, either in the free acid or salt form, by heating the cyanoethyl compound with aqueous mineral acid or aqueous alkali in accordance with the procedure described in copending U.S. application Ser. No. 814,671, now U.S. Patent 3,235,553.

The di(2-cyanoethyl) isocyanurate reactant may be prepared in accordance with the procedure described in the copending U.S. application described above or as described in J. Org. Chem. 25, 1945 (1960), while the methyl sulfate may be any of those commercially available.

It is not known what the exact mechanism of the reaction is, but it is believed that the presence of the two cyanoethyl groups on the cyanuric acid nucleus may be activating the residual hydrogen so that reaction with dimethyl sulfate is possible.

Since the reaction of this invention is essentially nucleophilic substitution at a saturated carbon, other lower alkyl sulfates may be used.

The reaction will be described further in conjunction with the following specific examples, but it is to be understood that these are merely illustrative in nature and not intended to limit the invention thereto.

EXAMPLE I

In a 250-ml. round-bottomed flask equipped with stirrer, condenser, thermometer and dropping funnel was placed 100 ml. $H_2O$, 8 grams NaOH, and 46 grams di(2-cyanoethyl) isocyanurate (isolated as a by-product from the production of tris(2-cyanoethyl) isocyanurate prepared in accordance with U.S. application Ser. No. 814,671). To the resulting clear, basic solution was added, dropwise, 26 grams of dimethyl sulfate. The temperature rose to 63° C. and heating was applied until the solution refluxed. The mixture was refluxed for 1 hour. On cooling, the white solid 1,3 - di(2 - cyanoethyl)-5-methyl isocyanurate precipitated. The product, isolated by filtration, weighed 42 grams, melting point 114–115° C. (87.4% yield).

Analysis.—Calculated for $C_{10}H_{11}N_5O_3$: C, 48.40%; H, 4.42%; N, 28.09%. Found: C, 48.69%; H, 4.65%; N, 27.69%.

EXAMPLE II

A mixture of 0.093 mol 1,3-di(2-cyanoethyl)-5-methyl isocyanurate, prepared according to Example I, and 100 ml. 6 N HCl was refluxed for 2.0 hours. An 81% yield of 1,3-di(2-carboxyethyl)-5-methyl isocyanurate crystallized from the solution on cooling. The product was a white solid, melting point 182–185° C.

Analysis.—Calculated for $C_{10}H_{13}N_3O_7$: C, 41.81%; H, 4.56%; N, 14.63%. Found: C, 42.20%; H, 4.68%; N, 14.93%.

EXAMPLE III

In a small flask equipped with vacuum outlet was placed 14.3 grams of 1,3-di(2-carboxyethyl)-5-methyl isocyanurate, obtained according to Example II, and 7.3 grams hexamethylene glycol. The mixture was heated to 200° C. for about 3.5 hours. Then vacuum was applied (0.25 mm. Hg) for about 2.5 hours. From the resulting polymer a fiber was pulled. This fiber had excellent properties; for example, it was both strong and elastic.

We claim:
1. 1,3-di(2-cyanoethyl)-5-methyl isocyanurate.
2. 1,3-di(2-carboxyethyl)-5-methyl isocyanurate.
3. A process for producing the compound of claim 1 which comprises reacting di(2-cyanoethyl) isocyanurate with dimethyl sulfate.
4. A process according to claim 3 wherein the reaction is carried out at a temperature between about 20 and about 100° C. in aqueous medium and dimethyl sulfate and di(2-cyanoethyl) isocyanurate are present in at least equimolar proportions.
5. A process according to claim 4 wherein at least one mol of caustic agent is present in said medium and the dimethyl sulfate and di(2-cyanoethyl) isocyanurate are present in equimolar amounts.

References Cited

UNITED STATES PATENTS

| 3,042,672 | 7/1962 | Lloyd | 260—248 |
| 3,235,553 | 2/1966 | Sadle | 260—248 |

HENRY R. JILES, *Primary Examiner.*

J. M. FORD, *Assistant Examiner.*